United States Patent

Watts et al.

[11] 4,000,359
[45] Dec. 28, 1976

[54] INTERPOLYMER OF A NITRILE, VINYLIDENE CHLORIDE AND ACRYLATE MONOMERS

[75] Inventors: William A. Watts; Jin-Liang Wang, both of Akron, Ohio

[73] Assignee: The Goodyear Tire & Rubber Company, Akron, Ohio

[22] Filed: Dec. 16, 1974

[21] Appl. No.: 532,971

[52] U.S. Cl. .............................. 526/328; 526/224; 526/225; 528/488
[51] Int. Cl.² ........................................ C08F 220/68
[58] Field of Search .................. 260/80.81; 526/328

[56] References Cited

UNITED STATES PATENTS

| | | | |
|---|---|---|---|
| 3,097,178 | 7/1963 | Townsend et al. | 260/80.81 |
| 3,297,666 | 1/1967 | MacPherson | 260/80.81 |
| 3,310,514 | 3/1967 | Trofimow et al. | 260/80.81 |
| 3,313,757 | 4/1967 | Trofimow et al. | 260/80.81 |
| 3,317,449 | 5/1967 | Isaacs et al. | 260/80.81 |
| 3,497,481 | 2/1970 | Blood et al. | 260/80.81 |
| 3,817,780 | 6/1974 | Hinkamp et al. | 260/80.81 |
| 3,832,335 | 8/1974 | Bayer | 260/80.81 |
| 3,879,359 | 3/1975 | Hinkamp | 260/80.81 |

*Primary Examiner*—Joseph L. Schofer
*Assistant Examiner*—Maria S. Tungol
*Attorney, Agent, or Firm*—F. W. Brunner; J. D. Wolfe

[57] ABSTRACT

This polymer comprises (a) about 15 to 5 weight percent of units from at least one nitrile monomer of the formula

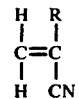

where $R$ is hydrogen or methyl; (b) about 75 to 90 weight percent of units from vinylidene chloride, and (c) about 10 to 5 weight percent of units from at least one acrylate monomer of the formula

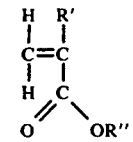

where $R'$ is hydrogen or alkyl of 1 to 4 carbon atoms and $R''$ is alkyl of 1 to 20 carbon atoms.

3 Claims, No Drawings

INTERPOLYMER OF A NITRILE, VINYLIDENE CHLORIDE AND ACRYLATE MONOMERS

This invention relates to a method of making improved terpolymers, to said terpolymers, and films made of said terpolymers.

Vinylidene chloride/vinyl chloride polymers are sold in great volume as plasticized films for overwraps or protective coatings for foodstuff. Some of these usages require the film to have a continuous coherent nature as well as offer resistance or a barrier to passage of oxygen and water vapor. Also, these films should have good tear, tensile, elongation and sealability, to mention only a few of the more desirable physical properties.

An object of this invention is to provide a process for making a polymer which yields a film that can be used in an unplasticized state as an overwrap or protective film.

This object is achieved by polymerizing a mixture of about 10 to 5 parts of acrylate monomer, 15 to 5 parts of nitrile monomer and 75 to 90 parts vinylidene chloride (VDC) with a free radical initiator such as the peroxide catalysts to yield a polymer soluble in tetrahydrofuran (THF) and readily castable from THF solution as a flexible film with extremely low oxygen and water vapor transmission rates. One of the advantages of the film of this invention as a protective coating is its high flexibility without need to use plasticizer as is the common practice with the commercial films used for overwraps for food. Usually the preferred polymers of this invention can be made from the following precursors in amounts of about 10 to 5 phr (parts per hundred) of 2-ethylhexyl acrylate (2-EHA) or methacrylate, about 15 to 5 phr of acrylonitrile (AN) and 75 to 90 phr of vinylidene chloride. where emulsion polymerization is used to make the polymer, various modifiers such as the aliphatic and aryl mercaptans or disulfides or even carbon tetrachloride, carbon tetrabromide, chloroform or iodoform can be used to advantage to control the polymer molecular weight and related physicals.

Also, the polymer properties can be modified to build in certain desirable attributes by including in the polymerization recipes crosslinkers such as triallyl cyanurate and ethylene glycol dimethacrylate or divinylbenzene (DVB). Small amounts of these crosslinkers, preferably 0.2 to 1.5 phr are desirable if polymer is to be extended to form films.

The preferred films which possess excellent physical properties are the films made from terpolymers of 2-EHA, AN and VDC. Instead of 2-EHA other typical alkyl acrylates and alkyl methacrylates can be used. Illustrative of these other alkyl acrylates and methacrylates are the following: methyl acrylate, ethyl acrylate, n-propyl acrylate, isopropyl acrylate, n-butyl acrylate, isobutyl acrylate, n-amyl acrylate, n-hexyl acrylate, isohexyl acrylate, n-heptyl acrylate, isoheptyl acrylate, 1-methyl-heptyl acrylate, n-octyl acrylate, isooctyl acrylates such as 6-methyl-heptyl acrylate, n-nonyl acrylate, isononyl acrylates such as 3,5,5-trimethylhexyl acrylate, n-decyl acrylate, lauryl acrylate and corresponding alkyl methacrylates and other primary, secondary and tertiary higher alkyl acrylates and methacrylates, where the alkyl radical can vary from 1 to 20 carbon atoms with the preferred species being those having 6 to 10 carbon atoms.

In addition to the acrylates or methacrylates set forth above, the hydroxy alkyl esters of acrylic acid or methacrylic acid are of interest in the present invention, particularly 2-hydroxyethyl acrylate, 1-chloro-2-hydroxyethyl acrylate, 3-hydroxypropyl acrylate, 2,3-dihydroxypropyl acrylate, glyceryl acrylate, 2-methoxy-3-hydroxypropyl acrylate, 2-hydroxy-butyl acrylate, 3-hydroxy-butyl acrylate, 3,4-dihydroxy-butyl acrylate, 2-methoxy-3,4-dihydroxy-butyl acrylate, 5-hydroxy-amyl acrylate, 6-hydroxyhexyl acrylate, 2-ethyl-6-hydroxy-hexyl acrylate, 7-hydroxyheptyl acrylate, 1-methyl-7-hydroxy-heptyl acrylate, 6-hydroxy-octyl acrylate, 3,4,5-trimethyl-6-hydroxy-hexyl acrylate and 10-hydroxy-decyl acrylate and other higher hydroxy-alkyl acrylates and methacrylates where the alkyl radical has the number of carbon atoms set forth above. Various vinyl nitriles such as methacrylonitrile and ethacrylonitrile are included in this invention.

The polymerization of the new terpolymer of the present invention may be carried out in any conventional manner, although polymerization in an aqueous emulsion is preferred. Alternately, polymerization may be carried out in an aqueous suspension system, or in solution in a suitable well-known solvent for the monomer, such as methyl ethyl ketone and tetrahydrofuran.

Whatever method of polymerization is employed, any catalyst commonly employed may be used, including actinic radiation, peroxygen compounds such as hydrogen peroxide, cumene hydroperoxide and persulfates and percarbonates and azo or diazo compounds. These catalysts may be activated when used in combination with a reducing substance such as sodium and ferrous salts. Any of the usual emulsifying agents may be used including ordinary soaps, such as the alkali metals of fatty acids including sodium oleate, and the detergents generally known as the sulfates and sulfonates, such as sodium lauryl sulfate and sodium isopropyl naphthalene sulfonate.

Polymerization may be carried out in the presence of air, but faster reactions are observed in the absence of oxygen at temperatures ranging from $-30°$ C. to $110°$ C., although preferred temperatures range from about $5°$ C. to about $80°$ C.

A series of emulsion polymerizations of 2-EHA/AN/VDC were carried out in eight-ounce bottles. All the ingredients (0.25 phr potassium persulfate, 0.2 phr tertiary dodecyl mercaptan (t-DDM), 0.0825 phr DVB, 2.0 phr sodium tetradecyl sulfate, 100 phr total monomers in the ratio desired in the terpolymer and 200 phr distilled water) were charged into eight-ounce bottles and flushed well with nitrogen and then reacted at $50°$ C. to about 32 percent solids in 24 hours. The whole bottle was cooled to room temperature and three phr distilled water and 0.25 phr 30 percent $H_2O_2$ added and agitated for 20 minutes. Finally, this polymer was coagulated in 1.0 percent warm $MgSO_4$ solution ($27°-38°$ C.) or deep frozen at $-29°$ C., washed thoroughly several times with distilled water and dried in an oven at $50°$ C. for about 5 hours. This terpolymer consisted of 5/10/85 2-EHA/AN/VDC respectively.

Similary, a series of emulsion polymerizations of 2-EHA/AN/VDC were carried out in five gallon reactors. The procedure was as follows: add 2.0 phr sodium tetradecyl sulfate to 200 phr deionized water. Then add 0.25 phr potassium persulfate. Then add the above contents to reactor, seal, and purge well with nitrogen. A solution of 5 phr 2-EHA, 0.0825 phr DVB and 0.2 phr t-DDM was added to the reactor and followed by the addition of 10 phr AN and 85 phr VDC and reacted to give a 33 percent solids reaction product before cooling to room temperature. The reaction product had three phr deionized water and 0.25 phr 30 percent hydrogen peroxide added to stop polymerization before coagulation. The reaction product was obtained by coagulation with one percent warm magnesium sulfate solution followed by water washing and drying.

The emulsion terpolymers were dissolved in tetrahydrofuran at 49° to 55° C. using a low speed air stirrer. The resultant solution was cast onto glass plates and allowed to dry in a 49° C. oven for 10 to 15 minutes and then placed into a 77° C. oven for one to 1.5 hours. After drying, the films were stripped from the glass and tested for tear, tensile, elongation, oxygen and water vapor transmission rates and found to be acceptable even though they were unplasticized.

To those skilled in the art, one knows that various ingredients such as lubricants, stabilizers, pigments, toners, surfactants, ultraviolet absorbers, antioxidants, can be added to the film depending upon the intended use and nature thereof. In addition, the 2-EHA/AN/VDC polymer can be extruded using proper equipment and conditions.

Typical results obtained on the 2-EHA/AN/VDC, 5/10/85 terpolymer film are compared with a typical commercial wrap of a vinylidene chloride/vinyl chloride copolymer film in the table below where WVTR is the abbreviation for water vapor transmission rate on one mil thick film, expressed as grams per 100 square inches in 24 hours and $O_2TR$ is oxygen transmission rate expressed as cubic centimeters per 100 square inches in 24 hours at atmospheric pressure. T and E are tensile and elongation.

Table 1

| Sample Film | Gauge, Mils | WVTR | $O_2TR$ | T PSI | E % | Tear gm/mil |
|---|---|---|---|---|---|---|
| 2-EHA/AN/VDC (5/10/85 parts) | 1.05 | .5 | .5 | 3780 | 310 | 43.0 |
| Commercial wrap | 1.00 | .25 | 1.0 | 8000 | 60 | 15.0 |

The 2-EHA/AN/VDC film had excellent tear and flexibility properties in the unplasticized condition compared to the plasticized commercial wrap film of polyvinyl chloride/vinylidene chloride.

In the above series of bottle polymerizations, the 2-EHA was replaced with butyl acrylate (BA) and the amount of VDC, AN and BA were varied to give the polymers having the content of monomer shown in Table 2. The emulsifier agent used was sodium tetradecylsulfate and the polymers were dissolved in tetrahydrofuran (THF). The film was formed by casting the THF solution on a plate to give a film 1.0 mil thick. The test data on these films are given in Table 2.

Table 2

| PHYSICAL PROPERTIES OF VDC/AN/BA FILMS WITH VARYING AN/BA | | | |
|---|---|---|---|
| Recipe Formulation | A | B | C |
| VDC, % | 85 | 85 | 85 |
| AN, % | 5 | 7.5 | 10 |
| BA, % | 10 | 7.5 | 5 |
| Gauge, Mils | 1.0 | 1.0 | 1.0 |
| Intrinsic Viscosity | .69 | .83 | .88 |
| 100% Modulus, psi L | 560 | 730 | 1515 |
| T | 640 | 770 | 1495 |
| Ultimate psi, L | 1800 | 2140 | 3005 |
| T | 2390 | 2720 | 2960 |
| Elongation %, L | 310 | 305 | 260 |
| T | 345 | 360 | 280 |
| Elmendorf Tear, L gm/mil | 213 | 178 | 56 |
| T gm/mil | 243 | 168 | 64 |
| $O_2TR$ | 2.0 | 0.5 | 0.32 |
| WVTR | 0.65 | 0.60 | 0.52 |
| Heat Seal Min. Temp. | 260 | 370 | 470 |
| Max. Temp. | >600 | >600 | >600 |
| Seal Strength lb/in | 1.34 | 1.50 | 2.10 |
| Light Transmission % | 91.5 | 91.1 | 90.5 |
| Haze % | 3.2 | 3.5 | 2.2 |

Heat seal is expressed as ° F. at 20 psi for one-fourth second. L and T means the physical property was measured in length or transverse direction, respectively.

Films of the composition shown prepared by the procedure of the examples and containing the amounts of VDC, AN and 2-EHA given were tested and the results are shown in Table 3.

Table 3

| PHYSICAL PROPERTIES OF VDC/AN/2-EHA FILMS WITH VARIED VDC/ AN LEVELS WITH 2-EHA HELD AT FIVE PERCENT LEVEL | | | | | |
|---|---|---|---|---|---|
| Film Compositions | A-1 | B-1 | C-1 | D | E |
| VDC, % | 80 | 82.5 | 85 | 87.5 | 90 |
| AN, % | 15 | 12.5 | 10 | 7.5 | 5 |
| Intrinsic Viscosity | 1.18 | 1.05 | 0.95 | 0.74 | 0.65 |
| Gauge, Mils | 0.75 | 0.70 | 0.70 | 0.75 | 0.75 |
| 100% Modulus, L, psi | 2595 | 1615 | 1410 | 2025 | — |
| T, psi | 2500 | 1425 | 1460 | 1900 | — |
| Ultimate Tensile, L, psi | 3185 | 2360 | 2280 | 2250 | 2825 |
| Ultimate Tensile, T, psi | 3520 | 2490 | 2515 | 2040 | 2695 |
| Elongation, L, % | 160 | 180 | 205 | 190 | 70 |
| Elongation, T, % | 170 | 205 | 215 | 200 | 50 |
| Elmendorf Tear, L, gms/mil | 20 | 17 | 30 | 20 | 8 |
| Elmendorf Tear, T, gms/mil | 22 | 18 | 35 | 17 | 9 |
| WVTR | 0.90 | 0.66 | 0.47 | 0.29 | — |
| $O_2TR$ | 0.28 | 0.29 | 0.25 | 0.27 | — |

Likewise, Table 4 shows the effect of varying VDC and AN levels while the BA level is held at 5 percent.

Table 4

| PHYSICAL PROPERTIES OF VDC/AN/BA FILMS WITH VARIED VDC/AN LEVELS WITH BA HELD AT FIVE PERCENT LEVEL | | | | | |
|---|---|---|---|---|---|
| Film Composition | F | G | H | I | J |
| VDC, % | 80 | 82.5 | 85 | 87.5 | 90.0 |

Table 4-continued

PHYSICAL PROPERTIES OF VDC/AN/BA FILMS WITH VARIED VDC/AN LEVELS WITH BA HELD AT FIVE PERCENT LEVEL

| Film Composition | F | G | H | I | J |
| --- | --- | --- | --- | --- | --- |
| AN, % | 15 | 12.5 | 10 | 7.5 | 5 |
| Intrinsic Viscosity | 1.38 | 1.13 | 0.92 | 0.77 | 0.70 |
| Gauge, Mils | 0.75 | 0.80 | 0.75 | 0.75 | 0.75 |
| 100% Modulus, L, psi | 1700 | 1910 | 1820 | 1840 | — |
| 100% Modulus, T, psi | 2105 | 1870 | 1365 | 2038 | — |
| Ultimate Tensile, L, psi | 3020 | 3100 | 2855 | 2415 | 2615 |
| Ultimate Tensile, T, psi | 3490 | 2790 | 2720 | 2385 | 2500 |
| Elongation, L, % | 210 | 205 | 210 | 220 | 110 |
| Elongation, T, % | 200 | 190 | 230 | 215 | 65 |
| Elmendorf Tear, L, Gms/mil | 29 | 34 | 30 | 41 | 12 |
| Elmendorf Tear, T, Gms/mil | 30 | 31 | 44 | 49 | 15 |
| WVTR | 0.94 | 0.76 | 0.48 | 0.34 | — |
| $O_2TR$ | 0.32 | 0.34 | 0.33 | 0.31 | — |

The thermoplastic interpolymer can be prepared by addition polymerization of an intimate admixture of nitrile, vinylidene chloride and acrylate monomers, the interpolymer being characterized by the ability to form a film in the unplasticized state of low oxygen and water vapor transmission rates. This polymer comprises (a) about 15 to 5 weight percent of units from at least one nitrile monomer of the formula

where $R$ is hydrogen or methyl; (b) about 75 to 90 weight percent of units from vinylidene chloride, and (c) about 10 to 5 weight percent of units from at least one acrylate monomer of the formula

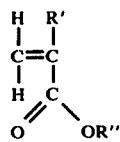

where $R'$ is hydrogen or alkyl of 1 to 4 carbon atoms and $R''$ is alkyl of 1 to 20 carbon atoms.

Although this invention has been illustrated and exemplified with the monomers of Tables 1, 2 and 3, it should be readily appreciated the other monomers listed heretofore could be used advantageously in the recipes of the tables.

While certain representative embodiments and details have been shown for the purpose of illustrating the invention, it will be apparent to those skilled in this art that various changes and modifications may be made therein without departing from the spirit or scope of the invention.

What is claimed is:

1. A thermoplastic interpolymer prepared by addition polymerization of an intimate admixture of acrylonitrile, vinylidene chloride and 2-ethylhexyl acrylate, the interpolymer forming a flexible film in the unplasticized state of low oxygen and water vapor transmission rates consisting essentially of:
   a. 15 to 5 weight percent of units of acrylonitrile;
   b. 75 to 90 weight percent of units from vinylidene chloride; and
   c. 10 to 5 weight percent of units from 2-ethylhexyl acrylate.
2. The thermoplastic interpolymer of claim 1 where the intimate mixture of acrylonitrile, vinylidene chloride and 2-ethylhexyl acrylate contains 0.2 to 1.5 phr of a crosslinker on the total monomers present in the mixture at the time polymerization occurs.
3. The thermoplastic interpolymer of claim 1 wherein the crosslinker is divinylbenzene.

* * * * *